United States Patent
Vija et al.

(10) Patent No.: US 8,208,706 B2
(45) Date of Patent: Jun. 26, 2012

(54) FUNCTIONAL IMAGE PRESENTATION

(75) Inventors: Alexander Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 697 days.

(21) Appl. No.: 12/369,167

(22) Filed: Feb. 11, 2009

(65) Prior Publication Data

US 2010/0014731 A1 Jan. 21, 2010

Related U.S. Application Data

(60) Provisional application No. 61/081,121, filed on Jul. 16, 2008.

(51) Int. Cl.
*G06K 9/00* (2006.01)
(52) U.S. Cl. ........................... 382/130; 382/128
(58) Field of Classification Search .......... 382/128–132, 382/260–265
See application file for complete search history.

(56) References Cited

U.S. PATENT DOCUMENTS

| | | | |
|---|---|---|---|
| 5,155,365 A | | 10/1992 | Cann et al. |
| 5,970,182 A | * | 10/1999 | Goris .................. 382/278 |
| 6,399,951 B1 | | 6/2002 | Paulus et al. |
| 6,956,925 B1 | | 10/2005 | Hoffman |
| 7,916,910 B2 | * | 3/2011 | Cotton et al. ............ 382/128 |
| 2005/0259889 A1 | * | 11/2005 | Ferrari et al. ............ 382/275 |
| 2008/0310697 A1 | * | 12/2008 | Razifar et al. ............ 382/131 |

OTHER PUBLICATIONS

Shieh, et al., "Iterative image reconstruction using prior knowledge," J Opt Soc Am A Opt Image Sci Vis, vol. 23, No. 6, pp. 1292-300, Jun. 2006.
Adluru, et al., "Temporally constrained reconstruction of dynamic cardiac perfusion MRI", Magn. Reson. Med., vol. 57, No. 6, pp. 1027-1036, (Jun. 2007).
Hudson, et al., "Accelerated image reconstruction using ordered subsets of projection data", IEEE Trans. Med. Imaging, vol. 13, No. 4, pp. 601-609 (1994).
Turkheimer, et al., "PET image denoising using a synergistic multiresolution analysis of structural (MRI/CT) and functional datasets", J. Nucl. Med., 49:657-66.
Somayajula, et al. "PET image reconstruction using anatomical information through mutual information based priors." pp. 2722-2726.
Sureau, et al. "Impact of Image-Space Resolution Modeling for Studies with the High-Resolution Research Tomograph," J Nucl Med, vol. 49, No. 6, pp. 1000-1008, Jun. 1, 2008.
Alenius, et al.., "Generalization of median root prior reconstruction," IEEE Trans. Med. Imaging, vol. 21, No. 11, pp. 1413-1420, Nov. 2002.
Hsu, C.., "A prior image model with mixed continuity constraints for Bayesian PET image reconstruction," Nuclear Science Symposium, 1999, Conference Record, 1999 IEEE, vol. 3, pp. 1428-1432, Seattle, Washington, Oct. 1999.
Gindi, G., et al., "Bayesian reconstruction of functional images using anatomical information as priors", IEEE Trans. Med. Imaging, vol. 12, No. 4, pp. 670-680, 1993.

(Continued)

*Primary Examiner* — Ryan Howard
(74) *Attorney, Agent, or Firm* — Peter Kendall

(57) ABSTRACT

A computer-implemented method of presenting an image of an object includes causing a computer to execute instructions for providing a signal distribution of values N, generating a transformed distribution by calculating, for each value N, a transformed value $X=\sqrt{N+3/8}$, and outputting the transformed distribution.

18 Claims, 5 Drawing Sheets

OTHER PUBLICATIONS

Zhenyu, et al., "Approximate maximum likelihood hyper-parameter estimation for Gibbs priors." Image Processing, IEEE Transactions on, vol. 6, No. 6, pp. 844-861, 1997.

Reutter, et al., "Direct least-squares estimation of spatiotemporal distributions from dynamic SPECT projections using a spatial segmentation and temporal B-splines," Medical Imaging, IEEE Transactions on, vol. 19, No. 5, pp. 434-450, 2000.

Parra, et al., "List-mode likelihood: EM algorithm and image quality estimation demonstrated on 2-D PET," Medical Imaging, IEEE Transactions on, vol. 17, No. 2, pp. 228-235, 1998.

Nuyts, et al., "Simultaneous maximum a posteriori reconstruction of attenuation and activity distributions from emission sinograms," Medical Imaging, IEEE Transactions on 5 vol. 18, No. 5. pp. 393-403, 1999.

Hero, et al., "Information analysis of single photon emission computed tomography with count losses", Medical Imaging 9, IEEE Transactions, pp. 117-127 (1990).

Kadrmas, et al., "Maximum a posteriori algorithm for the reconstruction of dynamic SPECT data", IEEE Nuclear Science Symposium and Medical Imaging Conference, vol. 3, pp. 2086-2089, Nov. 8-14, 1998.

Kawata, et al., "Constrained Iterative Reconstruction by the Conjugate Gradient Method" IEEE Trans. Med. Imaging, vol. 4, No. 2, pp. 65-71, 1985.

LaRiviere, et al., "Nonparametric regression sonogram smoothing using a roughness-penalized Poisson likelihood objective function", IEEE Trans. Med. Imaging, vol. 19, No. 8, pp. 773-786, 2000.

Chiao, et al., "Model-based estimation for dynamic cardiac studies using ECT", IEEE Trans. Med. Imaging, vol. 13, No. 2, pp. 217-226, 1994.

Nichols, et al, "Spatiotemporal reconstruction of list-mode PET data," Medical Imaging, IEEE Transactions on, vol. 21, No. 4, pp. 396-404, 2002.

Kadrmas, et al., "4D maximum a posteriori reconstruction in dynamic SPECT using a compartmental model-based prior," Physics in Medicine and Biology, vol. 46, No. 5, pp. 1553-1574, 2001.

D. J. Kadrmas, "Statistically regulated and adaptive EM reconstruction for emission computed tomography," Nuclear Science, IEEE Transactions on, vol. 48, No. 3, pp. 790-798, 2001.

Shao, L., et al., "Information gain from count correction in SPECT image reconstruction and classification", IEEE Trans. Nucl. Science, vol. 37, No. 2, pp. 652-657, 1990.

Shieh, et al., "Image reconstruction: a unifying model for resolution enhancement and data extrapolation. Tutorial," J Opt Soc Am A Opt Image Sci Vis, vol. 23, No. 2, pp. 258-266, Feb. 2006.

Mighell, K.J., "Parameter estimation in astronomy with poisson-distributed data I. The statistic", Astrophys. J. 518, 380-393.

Wesolowski, C.A., et al., "Improved lesion detection from spatially adaptive, minimally complex Pixon® reconstruction of planar scintigraphic images", Comput. Med. Imaging Graph., 65-81.

Wernick, et al., "Emission tomography: the fundamentals of PET and SPECT", Chapters 7,11 and 21, Elsevier, Academic Press, 2004.

Galatsanos, et al., "Methods for Choosing the Regularization Parameter and Estimating the Noise Variance in Image Restoration and Their Relation", IEEE Transactions on Image Processing, vol. 1, No. 3, pp. 322-336 (Jul. 1992).

Fessler, et al., "Space-alternating generalized expectation—maximization algorithm", Signal Processing, IEEE T-SP 42 (10): 2664-77, (Oct. 1994).

Puetter, et al., "Digital Image reconstruction: deblurring and denoising", Annu. Rev. Astro. Astrophys., 2005, 43:139-194.

Puetter, et al., "The pixon method of image reconstruction", Astronomical Data Analysis Software and Systems VIII, Astronomical Society of the Pacific, Conference Series 1999, 172, 307-316.

Lehovich, et al., "Human observer LROC study of lesion detection in Ga-67 SPECT images reconstructed using MAP with anatomical priors", 2006 IEEE nucl., Sci. Symp. Conf. Rec., 1699-702.

Lehovich, et al., "Choosing anatomical-prior strength for MAP SPECT reconstruction to maximize lesion detectability", 2007 IEEE Nucl. Sci. Syrnp. Conf. Rec., 4222-5.

K.J. Mighell, "Parameter estimation in astronomy with Poisson-distributed data. II. The modified chi-square gamma statistic", 2000, arXiv:astro-ph/0007328.

J. Hadamard "Sur les problèmes aux dérivées partielles et leur signification physique", Princeton Uni. Bull., 13, 49-52, (1902).

Tsui, B.M.W., et al., "Quantitative cardiac SPECT reconstruction with reduced image degradation due to patient anatomy", IEEE Trans. Nuc. Sci., 41, 2838-44, 1994.

Gorman, J.D. and Hero, A.O., "Lower bounds for parametric estimation with constraints", IEEE Trans. Information Theory, vol. 36, No. 6, pp. 1285-1301, 1990.

Siemens Medical, "Symbia SPECT Working for You", Product Information, 2007.

Haacke, et al., "Constrained reconstruction: A super-resolution, optimal signal-to-noise alternative to the Fourier transform in magnetic resonance imaging", Medical Physics, vol. 16, No. 3, pp. 388-397, 1989.

Halder, et al., "Anatomically constrained reconstruction from noisy data", Magn. Reson. Med., vol. 59, No. 4, pp. 810-818, Apr. 2008.

Rangarajan, et al., "A model-based approach for filtering and edge detection in noisy images", IEEE Trans. Circuits and Systems, vol. 37, No. 1, pp. 140-144, 1990.

Roggemann, et al., "Model-based image reconstruction by means of a constrained least-squares solution", Appl Opt, vol. 36, No. 11, pp. 2360-2369, Apr. 10, 1997.

Roy, et al., "Three-dimensional unconstrained and constrained image-reconstruction techniques applied to fluorescence, frequency-domain photon migration", Appl. Opt., vol. 40, No. 13, pp. 2206-2215, May 1, 2001.

Tapiovaara, M.J. and Wagner, R.F., "SNR and noise measurements medical imaging: I. A practical approach based on statistical decision theory", Phys. Med. Biol., vol. 38, pp. 71-92, 1993.

Hadamard, J.,"Lectures on Cauchy's Problem in Linear Partial Differential Equations", New Haven: Yale Press. Reprinted 1952. New York: Dover Publications. (Webpage print out of coverpage, synopsis and table of contents from www.bn.com).

Green, P.J. and Silverman, B.W., "Generalized Linear Models: A Roughness Penalty Approach", Chapman & Hall/ CRC, 1994 (Webpage print out of coverpage, synopsis and table of contents from www.bn.com).

* cited by examiner

FUNCTIONAL IMAGE PRESENTATION

TECHNICAL FIELD

This invention relates to medical imaging, and in particular, to image presentation/quality assessment in functional imaging.

BACKGROUND

Medical imaging of metabolic and biochemical activity within a patient is known as functional imaging. Functional imaging techniques include, for example, nuclear imaging such as planar nuclear imaging, Single Photon Computed Tomography (SPECT), Positron Emission Tomography (PET), and functional computed tomography (fCT). The reconstruction of a functional image from data acquired by functional imaging is often difficult because the data can be characterized by a small signal rate and a low signal-to-noise ratio. For nuclear imaging, for example, the count rate is limited by the amount of a radioactive substance that can be administered without harming the patient. In addition, a functional image does not necessarily provide structural information. Thus, one often evaluates a functional image with the help of a structural image.

An overview of SPECT systems and PET systems as well as iterative image reconstruction for emission tomography is given in chapter 7, chapter 11, and chapter 21 of M. Wernick and J. Aarsvold, "Emission tomography: the fundamentals of PET and SPECT," Elsevier Academic Press, 2004, the contents of which are herein incorporated by reference. An overview of different reconstruction methods is given in R. C. Puetter et al., "Digital Image Reconstruction: Deblurring and Denoising," Annu. Rev. Astro. Astrophys., 2005, 43: 139-194, the contents of which are herein incorporated by reference.

Square root transforms and their mathematical effect on variance analysis are disclosed in M. S. Bartlett, "The square root transformation in analysis of variance," J. Roy Stat. Soc. Suppl., 3, 68-78, 1936, F. J. Anscombe, "The transformation of Poisson, binomial and negative-binomial data," Biometrika. 35, 236-254, 1948, and L. D. Brown and L. H. Zhao, "A test for the Poisson distribution," Sankhya: Indian J. Stat., 64, 61 1-625, 2002. An application of a square root transform for presenting scintigraphic images is disclosed in A. H. Vija et al., "Statistically based, spatially adaptive noise reduction of planar nuclear studies," Proc. SPIE, 5747, 634-645, 2005.

SUMMARY

The invention is based in part on the recognition that a visual evaluation of a medical image may be improved when the medical image is characterized by a constant noise level, for example, given by a standard deviation of the signal that is essentially independent from the signal intensity.

However, in functional imaging, the number of detected events can be Poisson-distributed and then the standard deviation of the noise of the detected events is proportional to the square root of the number of events. Accordingly the standard deviation of the detected events varies with the signal strength. Such an intensity dependent standard deviation affects the evaluation, which often includes, for example, evaluating the significance of a signal change in the medical image. Thus, a region of increasing intensity in a nuclear image can be characterized by increasing noise and increasing activity. Having a medical image with a constant noise level may allow distinguishing between noise contributions and activity (signal intensity) contributions to the medical image.

For Poisson-distributed events, an essentially constant standard deviation can be achieved by transforming the detected events into a transformed distribution according to $X = \sqrt{N+3/8}$. In "The transformation of Poisson, binomial and negative-binomial data," Biometrika. 35, 236-254, 1948, F. J. Anscombe has shown that such a transformation generates a nearly constant variance of $1/4$ for a Poisson variable with a large mean value.

Thus, presenting a transformed distribution of values $X = \sqrt{N+3/8}$ as a functional image, e.g., derived from nuclear imaging, provides the user with an image having a nearly constant standard deviation across the image. Such an image can enable one to more accurately diagnose, e.g., a medical condition.

In one aspect, the invention features computer-implemented methods of presenting a functional image for a measured object that include causing a computer to execute instructions for providing a signal distribution of values N, generating a transformed distribution by calculating, for each value N, a transformed value $X = \sqrt{N+3/8}$, and outputting the transformed distribution In another aspect, computer-implemented methods of presenting a functional image for a measured object that include causing a computer to execute instructions for providing a signal distribution of values N representing a functional activity, generating a transformed distribution by calculating, for each value N, a transformed value $X = \sqrt{N+3/8}$, and outputting the transformed distribution.

In another aspect, methods of presenting an image of an object include measuring Poisson-distributed image data, causing a computer to execute instructions for deriving a signal distribution of values N from the image data; generating a transformed distribution by calculating, for each value N, a transformed value $X = \sqrt{N+3/8}$, and outputting the transformed distribution.

In another aspect, functional imaging devices include a detector unit for detecting a functional signal from a measured object within a detecting area and providing image data indicative of the detected functional signal, and an image processing unit for deriving an image from the image data. The image processing unit is configured to derive a signal distribution of values N from the image data, generate a transformed distribution by calculating, for each value N, a transformed value $X = \sqrt{N+3/8}$, and provide the transformed distribution at an output of the image processing unit.

Implementations may include one or more of the following features.

In some embodiments, outputting the transformed distribution can include displaying an image based on the transformed distribution. Outputting the transformed distribution can include simultaneously displaying an image based on the transformed distribution and an image based on the signal distribution.

In some embodiments, the methods can further include deriving the signal distribution from measured functional image data. The signal distribution can be based on a sub-set of the measured image data. The sub-set can be selected based on, e.g., features within the functional image, magnitude of the signal (or values), or a pre-selected region of the object.

In some embodiments, providing the signal distribution can include providing a Poisson-distributed signal distribution.

In some embodiments, providing the signal distribution can include providing a signal distribution that corresponds to measured raw counts of a scintigraphic image. The methods can further acquire the scintigraphic image.

In some embodiments, the image data can correspond to an activity of functional process in the object.

In some embodiments, methods can further include acquiring the image data by at least one of planar nuclear imaging, single photon computed tomography, positron emission tomography, and functional computed tomography.

In some embodiments, the functional imaging devices can further include a display device, and the image processing unit can further be configured to display the transformed distribution as an image on the display device. The image processing unit can further be configured to simultaneously display on the display device an image corresponding to the signal distribution of an image corresponding to the transformed distribution.

The detector unit of the functional imaging device can include a detector system selected from the group consisting of a positron emission tomography detector system and a single photon computed tomography detector system.

The functional imaging device can further include an input device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
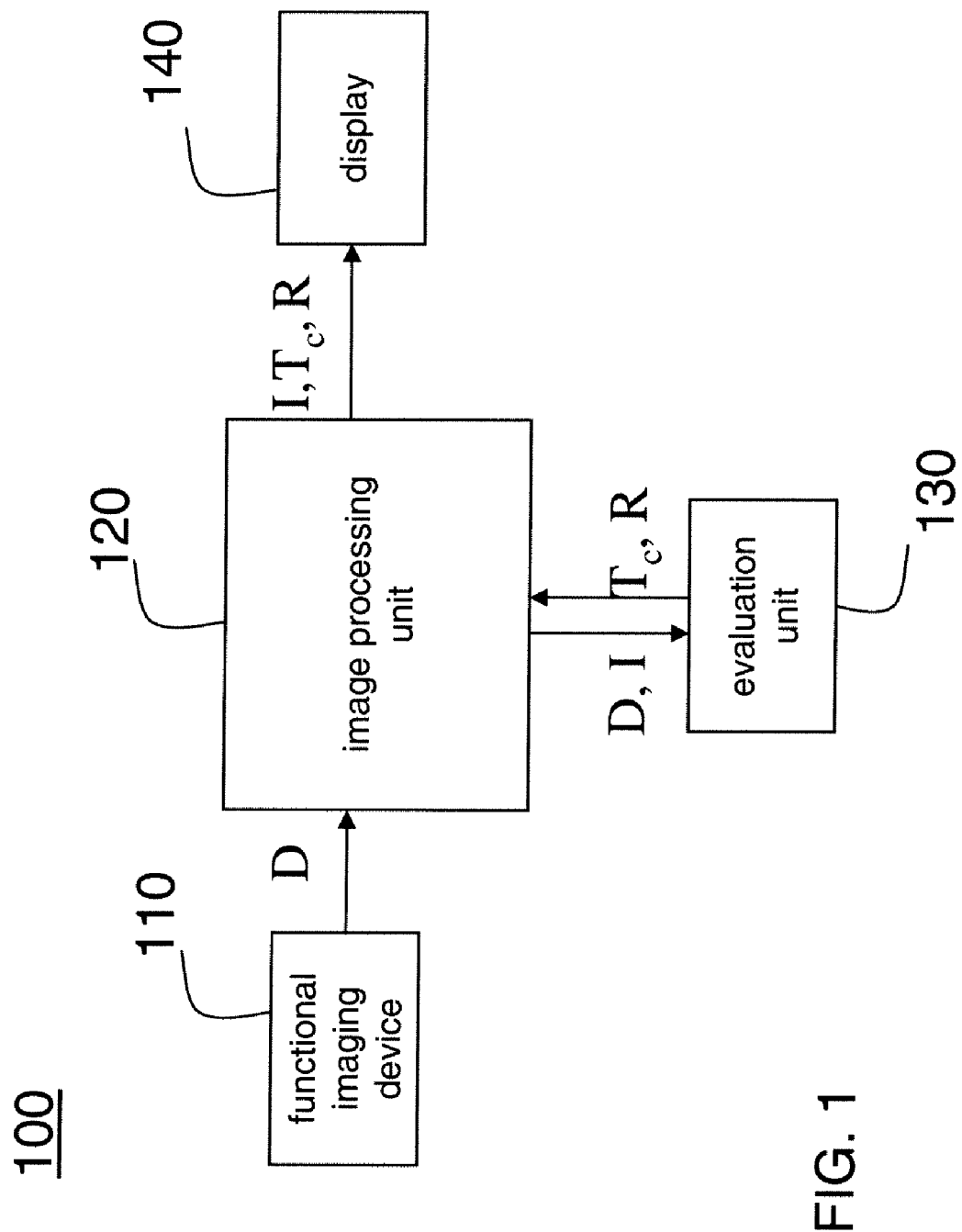
FIG. 1 is a schematic illustration of a functional imaging device.

Imaging techniques in medicine can generate two-, three- or higher dimensional images of functional processes in a patient's body by, for example, using nuclear properties of matter. Examples of these functional imaging techniques include PET, SPECT, and fCT, for which one often administers a radioactive substance to a patient and detects emitted radiation with a detector system, e.g., with a ring detector for PET or with one or several gamma cameras for planar nuclear imaging and SPECT.

For planar nuclear imaging, a detector remains stationary with respect to the patient to detect emitted radiation in one detector position only, corresponding to one projection and acquires a planar, two-dimensional (2D) nuclear image (herein also referred to as scintigraphic image). For tomographic imaging, one detects emitted radiation with multiple detector positions (projections) and reconstructs the acquired data into a three-dimensional (3D) image using a tomographic reconstruction algorithm. Planar and tomographic imaging can include additional dimensions such as the time and energy of the detected photons.

Because too much radiation can be harmful to the patient, the flux of detected nuclear radiation, i.e., the number of counts per unit time, is limited. As a result, functional imaging systems usually have to derive a functional image from a limited number of detected events.

An additional difficulty arises in the evaluation of functional images because nuclear counts are Poisson-distributed and the standard deviation (noise level) of counts varies with signal strength. Thus, it can be difficult to judge visually the statistical significance of a feature in an image (e.g., a scintigraphic image) that is based on nuclear activity and accordingly Poisson-distributed detector counts.

As an alternative to using Poisson counts N for presenting a scintigraphic image or for evaluating a tomographic image, one can use a transformation of the counts into an X-variable, which is generally defined as $$X = \sqrt{N+c},$$

where N is a Poisson-distributed variable and c is a transform-specific constant that provides transform-specific features to the distribution of the X-variable and associated statistical parameters such as the standard deviation of the X-variable. As further explained below, those transform-specific features can affect the visual impression of a presented image and/or allow a quality assessment of a functional image derived from Poisson-distributed counts.

Specifically, a nearly constant variance of the X-variable can be achieved by a transformation with the constant c having a value of $3/8$, i.e., $X = \sqrt{N+3/8}$. The advantage of such a defined X-variable is that the standard deviation of the noise of the X-variable, for counts $N \geq 2$, is almost independent of the signal strength (here the number of counts). In contrast, the standard deviation of the noise of the Poisson-distributed counts N, which is $\sqrt{N}$, varies with the signal strength. A constant noise level allows easier visual assessment of the statistical significance of signal changes. Consequently, the use of the above X-variable with $c = 3/8$ for presenting functional images can enable one to more accurately interpret the images.

Moreover, a nearly constant variance for a residual defined as $\Delta X = X - \sqrt{\lambda}$ for a detector element at a spatial position can be achieved for a transformation with the constant c having a value of $1/4$, i.e., $X = \sqrt{N+1/4}$. In the residual, $\lambda$ is the expected count at that spatial position derived for a reconstructed functional image.

Assessing the quality of image processing of, for example, planar and tomographic nuclear images can be based on evaluating the distribution of the residuals $\Delta X$. Using a value of $1/4$ for the constant C minimizes the dependence of the residuals on the signal for counts $N \geq 2$, while maintaining an almost constant variance of the residuals $\Delta X$. The residuals $\Delta X$ are suited for the task of quality assessment. Significant deviations of the residuals $\Delta X$ in a residual distribution may indicate problems with the reconstruction.

Conventional quality assurance of nuclear images is often done by eye, i.e., by subjectively assessing whether the processed image "makes sense" based on medical or other knowledge. Quality assurance can also include the inspection of difference image of the difference between the counts displayed or predicted by the processed image and the actual counts obtained.

In addition to a subjective evaluation of the above introduced residual distribution of the residual $\Delta X = X - \sqrt{\lambda}$, those residuals allows an automated evaluation to provide feedback to the image reconstruction. The automated evaluation can support a decision about, for example, the necessity of an additional iteration step. Alternatively or in addition, the automated evaluation can control the image reconstruction by modifying control parameters of, for example, a reconstruction algorithm. Controlling image reconstruction is applicable for image reconstruction in two, three, or more dimensions.

Figure 2:
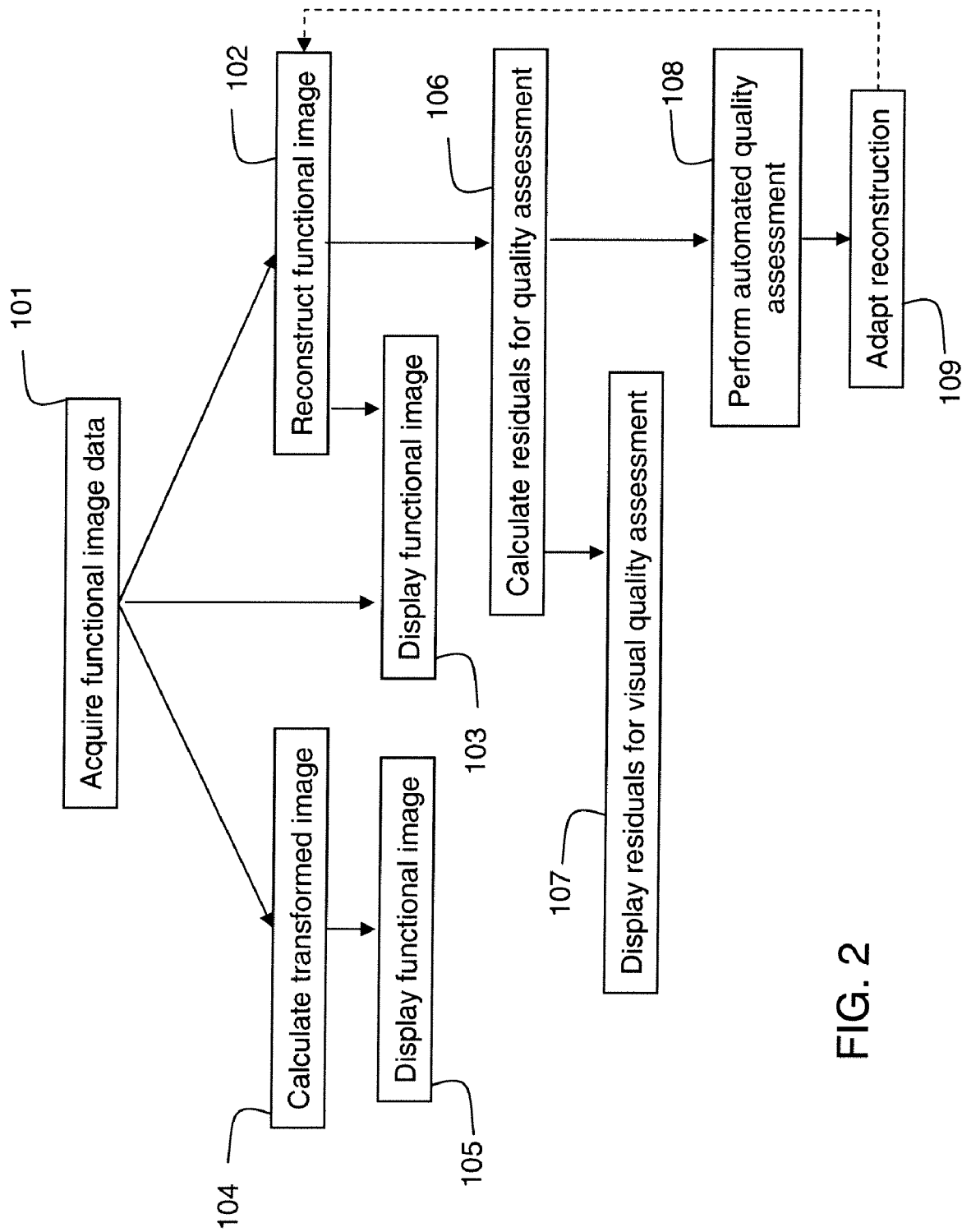
FIG. 2 is a simplified flowchart of image processing and quality assessment of processed images.
Figure 3:
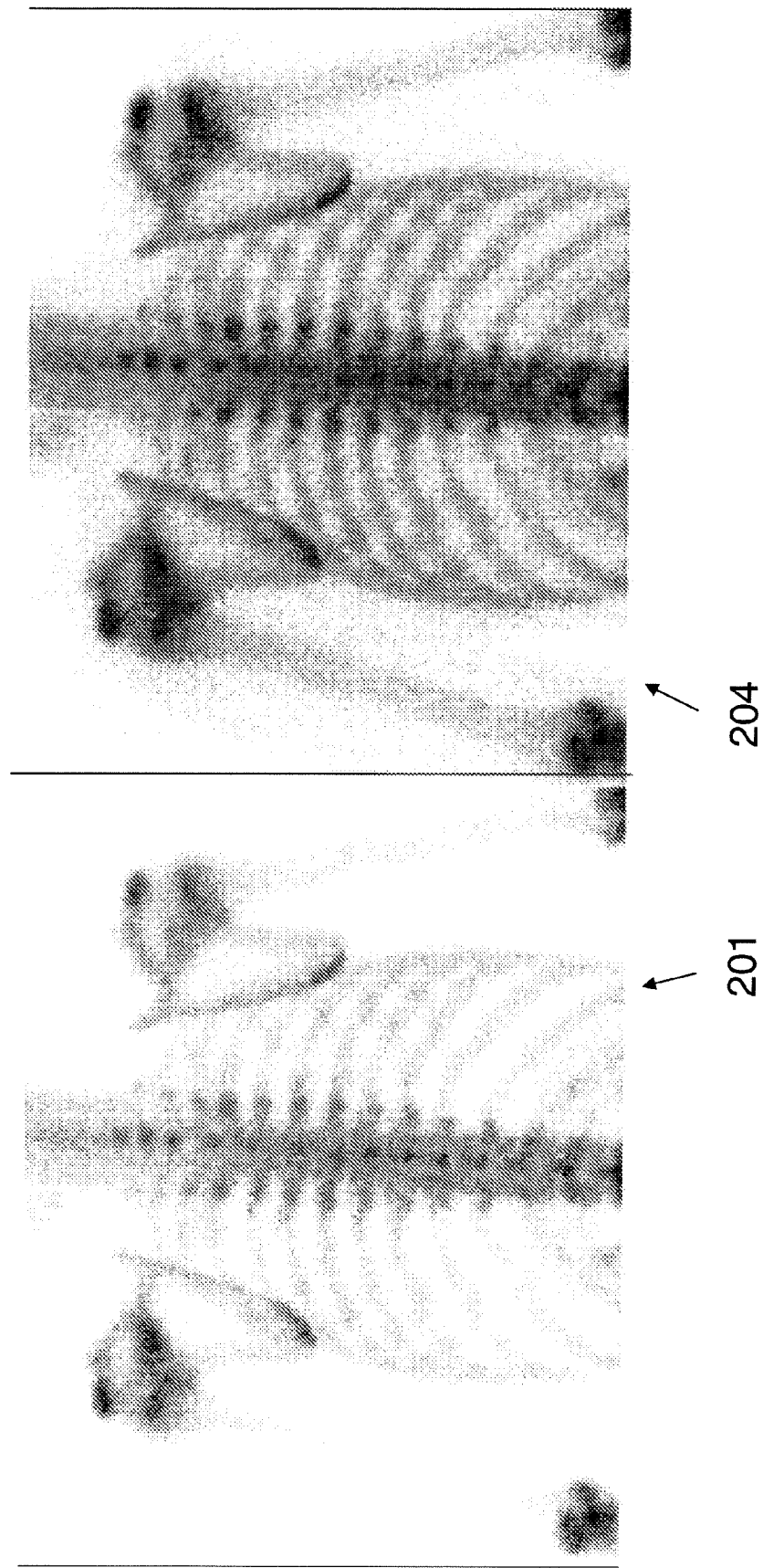
FIG. 3 is a side-by-side presentation of a scinitgraphic image and an image based on a first transformed distribution.
Figure 4:
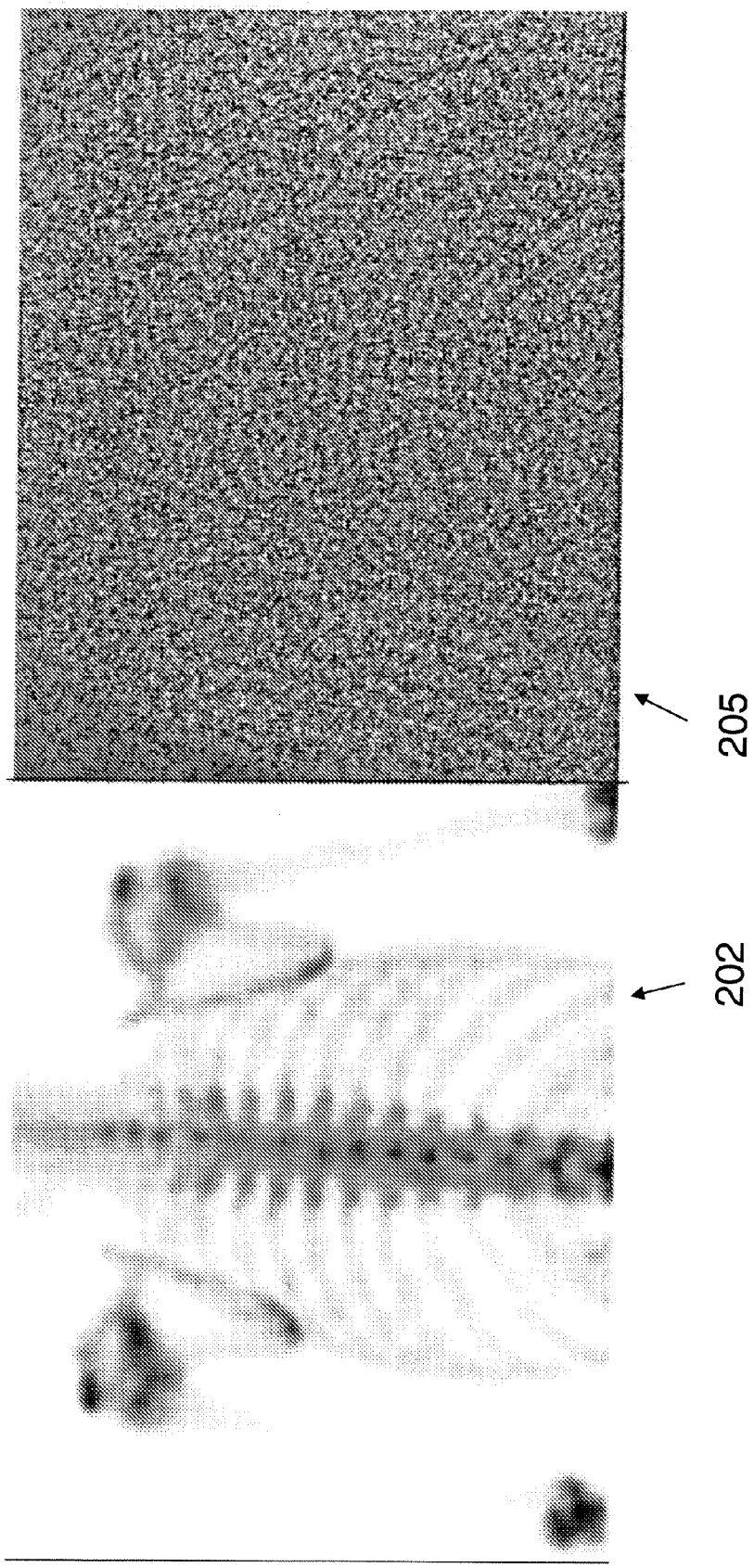
FIG. 4 is a side by side presentation of a reconstructed image and a quality image based on residuals between a second transformed distribution and expected counts based on the reconstruction.

As an example from the field of nuclear imaging, the concepts of presenting a functional image and assessing the quality of a reconstructed functional image are described in connection with FIGS. 1 and 2. Exemplary images and distributions for planar imaging are shown in FIGS. 3 and 4, and the application of quality assessment to control image reconstruction is explained in connection with FIG. 5.

Referring to FIG. 1, a functional imaging system 100 includes an imaging detector 110, an image processing unit 120, an evaluation unit 130, and a display 140. As shown in FIG. 2, the imaging detector acquires a signal distribution related to functional activity within a field-of-view of the imaging detector 110 (step 101). The acquired signal distribution can include a number of events $N_i$ at a point i in data space. For example, in the case of nuclear imaging, the imaging detector 110 comprises an array of detector elements that detect the nuclear γ-radiation, which is emitted from a patient after administering the radioactive substance. The signal distribution associates then a count of detected photons (events $N_i$) with each detector element of the detector 10. Examples for an imaging detector 10 include a conventional SPECT detector system and a PET detector system, which can be positioned around or partly around the patient.

The image processing unit 120 receives from the detector 110 the signal distribution, e.g., in form of a data set D of the detected events $N_i$, and derives from it a planar or tomographic functional image I. This functional image I is an estimate of a functional distribution of the detected (functional) activity associated with the functional processing the examined volume. The functional distribution is defined in an object space (step 102). The object space can be 2D in planar imaging and 3D or more dimensional in tomographic imaging. The functional image I can be displayed to a user on the display 140 as a 2D or 3D image (step 103).

For planar imaging, the image processing unit 120 can perform some image processing steps (e.g., one or more pixon smoothing operations) on the data set D to correct errors or enhance the quality of the functional image I. For tomographic imaging, the reconstruction is in general more complex and can, for example, use a system matrix to describe the nuclear imaging system 100 and an iteratively improved data model to calculate a tomographic image object as a functional image from the data set D.

The evaluation unit 130 is configured to calculate a transformed distribution $T_c$ of values $X_i = \sqrt{N_i + c}$ from the data set D (step 104). For planar imaging, a transformed distribution $T_{c=3/8}$ can be displayed to the user as a transformed image either alone or in combination with the functional image (step 105). FIG. 3 shows a planar scintigraphic image 201 based on detected nuclear events $N_i$ next to a transformed image 204 of transformed values $X_{i,c=3/8} = \sqrt{N_i + 3/8}$. The use of a constant noise level in generating transformed image 204 modifies the visual impression and assists a user in diagnosing the medical condition of the patient.

Alternatively, or additionally, the evaluation unit 130 can be configured to calculate a transformed distribution $T_{c=1/4}$ with transformed values $X_{i,c=1/4} = \sqrt{N_i + 1/4}$ and to derive (or receive from the image processing unit) expected events $\lambda_i$ from the reconstructed functional image I. For planar imaging, the smoothed image data D can essentially be treated as if they already represented the expected events $\lambda_i$, while for 3D and higher dimensional reconstruction the functional image, reconstructed in a 3D or higher dimensional object space, is first projected into data space to derive the expected events $\lambda_i$. The evaluation unit 130 is then further configured to calculate a residual distribution R from the transformed distribution $T_{c=1/4}$ and the expected events $\lambda_i$ (step 106). Specifically, a residual of the residual distribution R at a point i in data space is defined by $\Delta X_i = X_{i,c=1/4} - \sqrt{\lambda_i}$. An image of the residual distribution R can be displayed to a user on the display 140 (step 107).

For planar imaging, data space and object space coincide so that the residual distribution also contains information in object space. Accordingly, a deviation in the residual distribution R can be directly related to a position in the functional image and therefore the object. A side-by-side presentation of the residual distribution and the reconstructed image can then help to identify image related causes for deviations in the residual distribution. FIG. 4 shows a residual distribution 205 next to a reconstructed planar nuclear image 202. The reconstructed planar nuclear image 202 was derived by pixon-smoothing a raw count image that was derived from a planar nuclear imaging measurement.

The residual distribution can further be used for automated quality assessment (step 108) and controlling of parameters employed in the image reconstruction (step 109). The below introduced parameter of a preset cut-off value applied in pixon smoothing is an example of a parameter of a reconstruction algorithm that can be controlled, e.g., increased or decreased, by evaluating the residual distribution.

Pixon smoothing is based on a pixon map, which is derived from a search for a broadest possible pixon kernel function at each point in the object space such that the set of kernel functions collectively support an adequate fit of an object to the measured data set D. In particular, the pixon map assigns to each object point a specific pixon kernel function.

The construction of the pixon map is one example of using information gained from the residual distribution to control the reconstruction of the functional image. In brief, one constructs the pixon map by iteratively considering each of the pixon kernel functions individually, calculating a goodness-of-fit for every object point of an input object, and comparing the goodness-of-fit with a preset cut-off value. If the calculated goodness-of-fit of an object point fulfills a preset condition, one or more pixon kernel functions are assigned to that object point. The information about the set of assigned kernel functions is stored in the pixon map.

For image reconstruction, pixon smoothing and the generation of a pixon map are described in more detail in U.S. patent application Ser. No. 11/931,084, filed Oct. 31, 2007 and entitled "EXTERNAL PIXON FOR TOMOGRAPHIC IMAGE RECONSTRUCTION TECHNICAL FIELD," U.S. patent application Ser. No. 11/931,195, filed Oct. 31, 2007 and entitled "RECONSTRUCTING A TOMOGRAPHIC IMAGE," and U.S. patent application Ser. No. 11/931,030, filed Oct. 31, 2007 and entitled "DETERMINING A PIXON MAP FOR IMAGE RECONSTRUCTION," and U.S. patent applications filed on even date herewith and entitled "DETERMINING A MULTIMODAL PIXON MAP FOR TOMOGRAPHIC-IMAGE RECONSTRUCTION" by A. Yahil and H. Vija. The contents of all the preceding patent applications are incorporated herein by reference.

Figure 5:
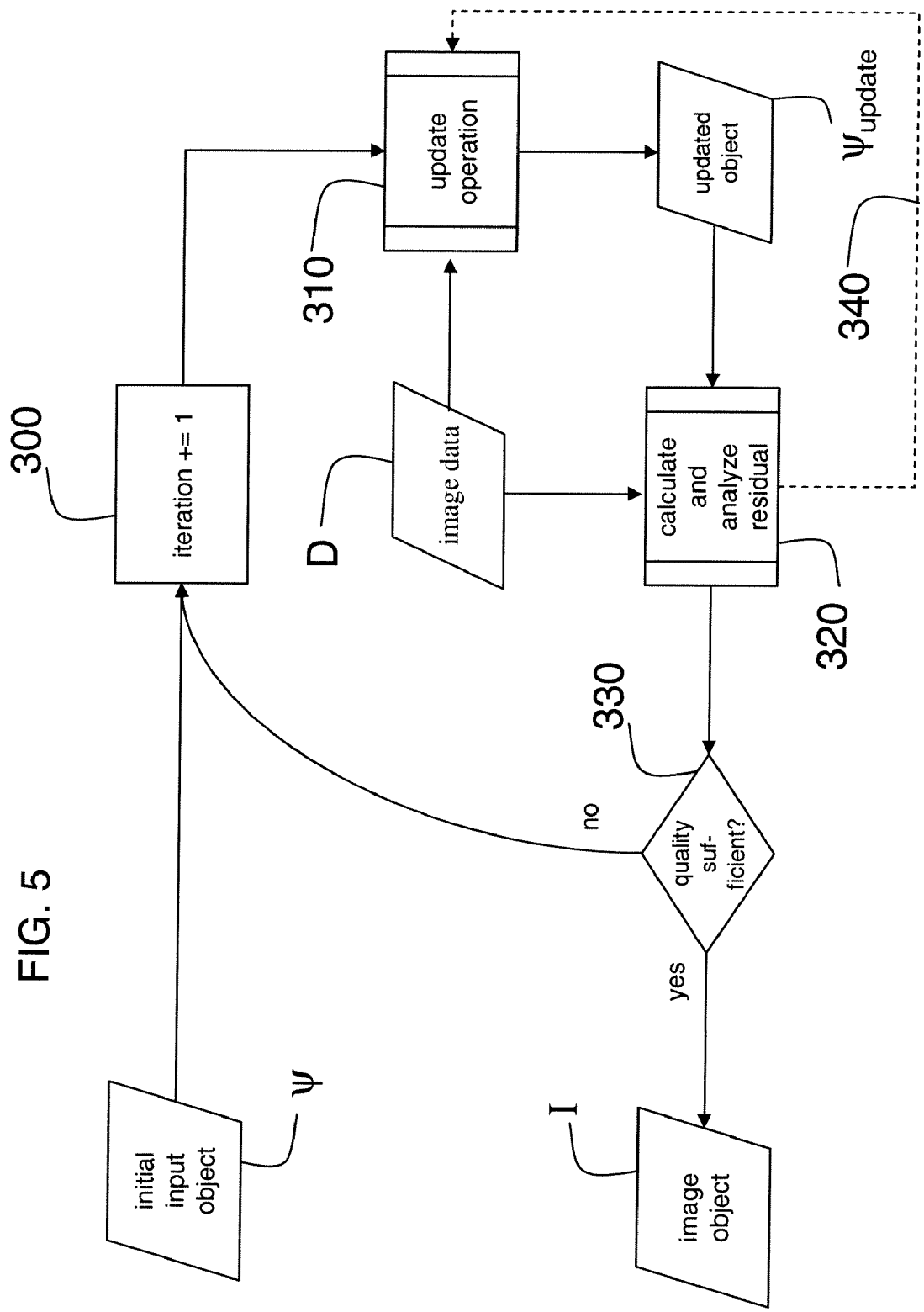
FIG. 5 is a flowchart illustrating quality controlled image reconstruction.

In general, an iterative reconstruction algorithm can impose quality control on the resulting image, as shown in FIG. 5. The control is based on assessing the quality of the iteratively updated reconstructed image. During the iteration process iterations of which are indicated by an increase of an iteration counter (step 300), an updated object $\psi_{update}$ is used as an input object for the update operation (step 310) of the next iteration step (the first iteration step uses an initial input object $\psi$). Thus, each iteration step begins with an improved estimate of the object. As iteration progresses, the updated object $\psi_{update}$ converges to a final distribution. In the context of PET or SPECT imaging, this distribution represents the distribution of a radioactive substance administered to the patient.

The update operation (step 310) can be, for example, an update operation of an ordered-subset-expectation-maximization algorithm, a non-negative least-squares algorithm, or a reconstruction algorithm using pixon smoothing. Moreover, the operation (step 310) can be an update operation of a multimodal image reconstruction as described in U.S. patent applications filed on even date herewith and entitled "MULTIMODAL IMAGE RECONSTRUCTION" by A. Yahil and H. Vija, the contents of which are incorporated herein by reference.

In many practices, the update operation (step 310) is subject to various control parameters, such as the cut-off parameter introduced above for pixon smoothing, the type of pixon kernel functions, and the number of iterations.

Referring again to FIG. 5, the update operation (step 310) is followed by a test operation of the quality of the updated object $\psi_{update}$ (step 320). Specifically, the test operation calculates and analyzes the distribution of the residuals $R_i = X_{i,c=1/4} - \sqrt{\lambda_i}$ based on the estimated events in data space derived for the reconstructed image and the X-variable for $c=1/4$. The test operation identifies, for example, the extent and the number of regions of residuals above a threshold value.

The algorithm then compares the test result with a quality-criterion and determines whether another iteration step should be performed (step 330). Additionally, or alternatively, the algorithm can adaptively modify the reconstruction (step 340). Such modification can include modifying the number of iterations or the number of parameters and their values, and any combinations thereof. The control can be performed, for example, in a similar manner to that described in the U.S. patent application Ser. No. 11/930,985, filed Oct. 31, 2007 and entitled "CONTROLLING THE NUMBER OF ITERATIONS IN IMAGE RECONSTRUCTION" by A. Yahil and H. Vija, the contents of which are incorporated herein by reference.

If no further iteration or modification of the update operation is necessary, the iteration is stopped and the currently calculated image object is assigned as the output of the reconstruction, i.e., as image object I.

A number of embodiments of the invention have been described. Nevertheless, it will be understood that various modifications may be made without departing from the spirit and scope of the invention. For example, the control of the reconstruction can be applied to a wide variety of reconstruction processes, including but not limited to maximum-likelihood-expectation-maximization algorithms, maximum a posteriori reconstruction algorithms, and Bayesian reconstruction algorithms.

The signal distribution can be discrete distributions, e.g., in nuclear imaging.

The updated object provided as image object I does not need to be the most recently updated object but could be the updated object with the highest quality. This could, in some cases, be an object that precedes the last object. Instead of being supplied to a renderer for visualization, the output object can be supplied to a record keeping system (e.g., PACS system) or a system for automatic quantitative diagnosing.

The source of the functional signal can be an object or patient positioned within the detecting area of the functional imaging system.

It is to be further understood that, because some of the constituent system components and method steps depicted in the accompanying figures can be implemented in software as well as hardware, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. A computer-implemented method of presenting an image of an object, the method comprising causing a computer to execute instructions for:

providing a signal distribution of values N;

generating a first transformed distribution by calculating, for each value N, a first transformed value $X = \sqrt{N + 3/8}$; and outputting the first transformed distribution;

generating a second transformed distribution by calculating, for each value N, a second transformed value $X = \sqrt{N + 1/4}$; and outputting the second transformed distribution.

2. The method of claim 1, wherein outputting the first transformed distribution includes displaying an image based on the first transformed distribution.

3. The method of claim 1, wherein outputting the first transformed distribution includes simultaneously displaying an image based on the first transformed distribution and an image based on the signal distribution.

4. The method of claim 1, wherein providing the signal distribution comprises providing a Poisson-distributed signal distribution.

5. The method of claim 1, wherein providing the signal distribution comprises providing a signal distribution that corresponds to measured raw counts of a scintigraphic image.

6. The method of claim 1, wherein providing the signal distribution includes deriving the signal distribution from a sub-group of image data measured for the object.

7. The method of claim 1, wherein the image data include measured functional image data.

8. A method of presenting an image of an object, the method comprising:

measuring Poisson-distributed image data; and causing a computer to execute instructions for:

deriving a signal distribution of values N from the image data;

generating a first transformed distribution by calculating, for each value N, a first transformed value $X=\sqrt{N+3/8}$; and outputting the first transformed distribution, generating a second transformed distribution by calculating, for each value N, a second transformed value $X=\sqrt{N+1/4}$; and outputting the second transformed distribution.

9. The method of claim 8, wherein the image data corresponds to an activity of functional process in the object.

10. The method of claim 8, further comprising acquiring the image data by at least one of planar nuclear imaging, single photon computed tomography, positron emission tomography, and functional computed tomography.

11. A functional imaging device comprising:
a detector unit for detecting a functional signal from a measured object within a detecting area and providing image data indicative of the detected functional signal;
an image processing unit for deriving an image from the image data, the image processing unit configured to:
derive a signal distribution of values $N_i$ from the image data; and
generate a first transformed distribution by calculating, for each value N, a first transformed value $X=\sqrt{N+3/8}$;
generate a second transformed distribution by calculating, for each value N, a second transformed value $X=\sqrt{N+1/4}$; and
provide the first transformed distribution and the second transformed distribution at an output of the image processing unit.

12. The functional imaging device of claim 11, further comprising a display device, and wherein the image processing unit is further configured to display the first transformed distribution as an image on the display device.

13. The functional imaging device of claim 11, wherein the image processing unit is further configured to simultaneously display on the display device an image corresponding to the signal distribution and an image corresponding to the first transformed distribution.

14. The method of claim 1, further comprising:
deriving a number of expected events λ from the signal distribution of values N;
generating a residual distribution by calculating, for each second transformed value X, a residual value $\Delta X = X - \sqrt{\lambda}$; and
outputting the residual distribution.

15. The method of claim 8, further comprising:
deriving a number of expected events λ from the signal distribution of values N;
generating a residual distribution by calculating, for each second transformed value X, a residual value $\Delta X = X - \sqrt{\lambda}$; and
outputting the residual distribution.

16. The functional imaging device of claim 11, wherein the image processing unit is further configured to:
derive a number of expected events λ from the signal distribution of values N;
generate a residual distribution by calculating, for each second transformed value X, a residual value $\Delta X = \sqrt{\lambda}$; and
provide the residual distribution at the output of the image processing unit.

17. The functional imaging device of claim 16, further comprising a display device, and wherein the image processing unit is further configured to display the residual distribution as an image on the display device.

18. The functional imaging device of claim 16, further comprising a display device, and wherein the image processing unit is further configured to display, on the display device, an image of the first transformed distribution and an image of the residual distribution.

* * * * *